3,836,573
PROCESS FOR THE PURIFICATION OF BENZENE-CARBOXYLIC ACID ESTERS BY CRYSTALLIZATION
Georg Schreiber, Rodenkirchen, Heinz Schroeder and Wolfgang Hoppe, Witten, Eugen Hadamovsky, Witten-Annen, Hans-Walter Ovenhausen, Herbede, and Bernhard Piotrowski, Wanne-Eickel, Germany, assignors to Dynamit Nobel Aktiengesellschaft, Troisdorf, Germany
Filed Nov. 12, 1971, Ser. No. 198,275
Claims priority, application Germany, Nov. 14, 1970,
P 20 56 149.3
Int. Cl. C07c 69/82
U.S. Cl. 260—475 B          9 Claims

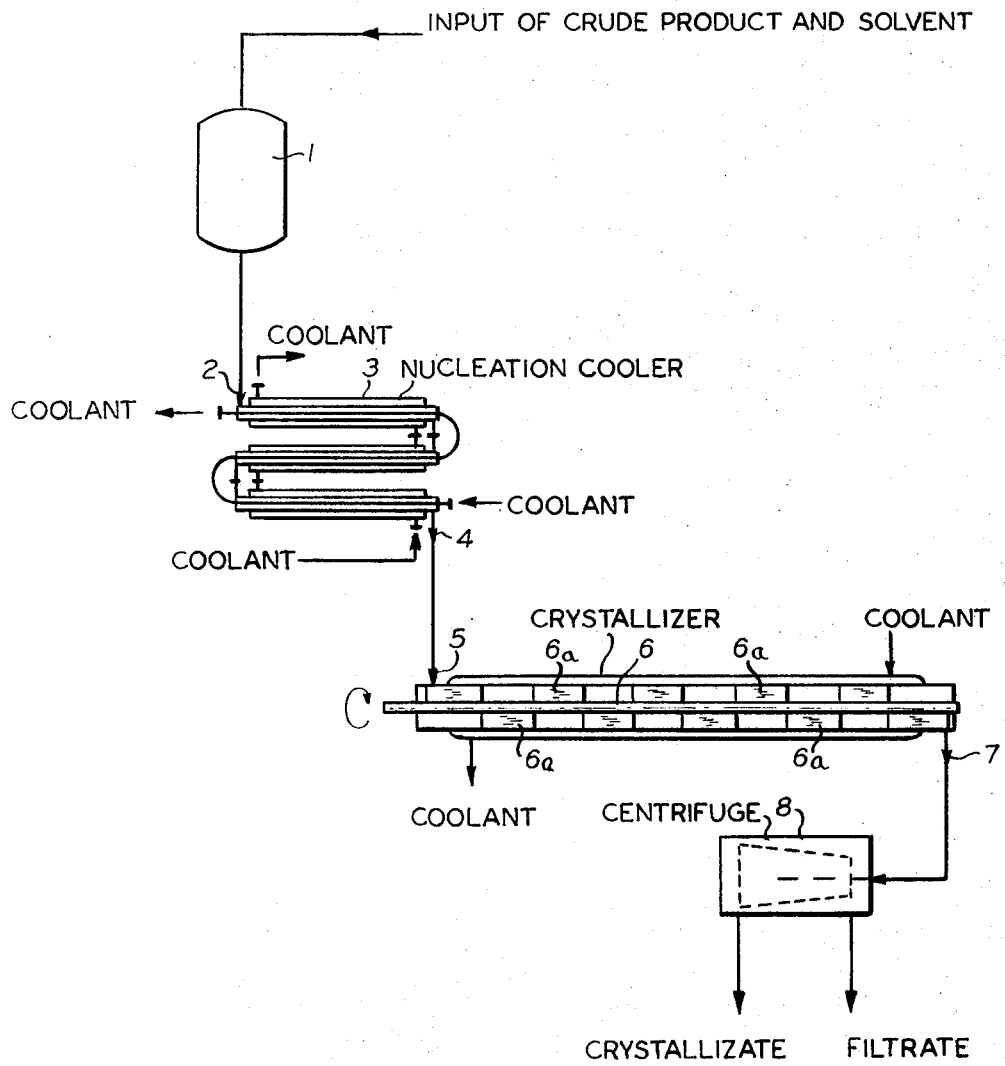

ABSTRACT OF THE DISCLOSURE

Benzenecarboxylic acids or benzenecarboxylic acid esters, in crude form, especially dimethylterephthalate in crude form is purified by crystallization in a continuous two stage process. In the first stage the crude form dissolved in, e.g. methanol, is passed as a thin film through a nucleation cooler wherein nucleation and initial crystal growth occur, the growth being to a particle size of, e.g. about 100 microns. In the second stage the effluent from the nucleation cooler is agitated and cooled for further crystal growth to provide crystals of sizes in the range of, e.g. 250–350 microns. The crystals can be separated by filtration or centrifuging. High unit time yields are obtained, at low investment cost and low storage capacity requirements.

BACKGROUND

The subject of the invention is a process for the purification of benzenecarboxylic acids, and especially of benzenecarboxylic acid esters, by continuous crystallization in separate stage of nucleation and crystal growing.

The invention is described via the special exasple of the crystallization of dimethylterephthalic acid i.e. dimethylterephthalate (DMT), but application to any process in which purification or separation is performed through crystallization is contemplated.

In the preparation of DMT, as in other chemical process, a number of by-products form in addition to the desired main product. To achieve a pure end product, one will always choose the technically simplest and cheapest purification process such as distillation, washing with special solvents, etc. If the physical characteristics of the impurities do not permit these commonly used methods for economic reasons, the separation can be performed in many cases on the basis of different solubility. Purification through crystallization can be considered particularly when, as in the case of DMT, a certain isomer content is present owing to the composition of the starting product. Often the isomers themselves can be used as solvents, and this is done world-wide in the large-scale industrial production of p-xylene from mixed xylenes, for example; in other cases, some other solvent must be used, as in the case of DMT.

In the purification of DMT, methanol serves as the solvent, because in the first place it is easily obtainable as a relatively cheap solvent, in the second place no re-esterification problems occur in the recrystallization process, and in the third place while the isomers dimethylisophthalic acid ester and dimethylorthophthalic acid ester are easily soluble in it in the cold state, DMT is soluble in large amounts only at higher temperature.

The recrystallization of the crude DMT has hitherto usually been performed discontinuously, by heating crude DMT and methanol in the necesary ratio in a pressurized vessel at a temperature of 100° C. until complete dissolution has occurred. Then, by letting off the pressure a portion of the methanol is evaporated and thus the solution is cooled down to the boiling point at normal pressure. Then the solution is cooled down to a temperature of 30 to 40° C. either by indirect cooling with water or by evaporative cooling by means of any type of vacuum pump.

The process just described has the following disadvantages:

(1) The discontinuous nature of this stage of purification in an otherwise continuous overall process requires relatively great intermediate storage facilities both for the product and for the solvent, and this is undesirable not only for reasons of cost but also, in the case of combustible fluids like methanol, for reasons of safety. If the crystallization process is to be performed repeatedly, expensive agitator storage tanks will also be required for the intermediate crystallization stages in order to prevent the crystal suspension from settling.

(2) In the discontinuous process used hitherto, nucleation and crystal growth take place simultaneously and in an uncontrolled manner due to the purging of the methanol down to normal pressure which lead to a grain size range of 10 to 1000 microns. Separting the crystals from the mother liquor in a suspension of this kind not only with centrifuges but also with filters is always more difficult than separating a suspension having a more narrow range of crystal sizes.

THE INVENTION

It has been found that the disadvantages of the known processes can be avoided and the crystallization process can be made more economical if the process is performed so that the nucleation and crystal growth are carried out in separate units, under certain conditions which are advantageous for those respective steps.

Research has shown that, through the measures proposed by the invention for controlling the supersaturation of the solvent, the nucleation and the crystal growth, DMT crystallization can be performed not only continuously, in a simple manner, but also more rapidly with a substantially smaller investment in apparatus.

The process of the present invention is advantageously carried out by performing the nucleation through rapid super saturation in a thin-layer nucleation cooler at a temperature ranging between 100 and 88° C., preferably 90° C. The further growth of the crystals to a particular size, preferably to about 250 to 350 microns, is performed in accordance with the invention at low relative supersaturation in a crystallizer at a temperature ranging from 90 down to 35° C. while the shaft equipped with scrapers revolves at a speed between 10 and 100 r.p.m. The series connected crystallizers are indirectly cooled only. The cooling surfaces are kept clean by the rotating scrapers. If desired, it is possible to exercise a favorable influence on grain size and crystal purity and to produce suspension that is easy to handle by recycling some of the mother liquor to the crystallizer.

Thus the invention provides for purification of DMT in a crude form in which the unwanted impurities include the dimethyl esters of ortho-phthalic acid (DMO) and isophthalic acid (DMI). The content of DMT in the crude mixture can be about 70 to 99 wt. percent. The crude mixture can be DMT in the crude form in which it is normally produced in commercial productions.

The crude form can be dissolved in methanol to provide a solution in which the concentration of the crude form is 10–45 wt. percent of the resulting solution. The solution can be maintained in a storage vessel at a temperature of about 120 to 70° C., preferably 110–100° C. and the corresponding pressures. It can be introduced into the nucleation cooler at said storage temperature. The nucleation cooler is a thin layer cooler, i.e. the solution passes through the cooler as a thin layer of about 2 to 20 mm., preferably about 5 to 10 mm. thickness. The outlet temperature is about 120–70° C., preferably, as noted above, about 100–88° C., and optimally about 90° C. The particles sizes of the nucleation crystals, i.e. the crystals leaving nucleation cooler are specified hereinafter. The effluent of the nucleation cooler passes directly to the crystallizer wherein final crystallization of this two stage purification process is completed. Thus the inlet temperature at the crystallizer can be substantially the outlet temperature, given above, for the nucleation cooler. In the crystallizer, where the residence time can be about 5–20 minutes, preferably 7–15 minutes, the crystal slurry is agitated to maintain the crystals in suspension, improve crystal growth and improve heat transfer, and is cooled to an outlet temperature of about 25–45, preferably 30–40° C., optimally 35° C. The particle sizes of the crystals in the effluent leaving the crystallizer are specified hereinafter. The purity of the product can be 99 wt. percent DMT minimum, starting with crude forms as are described above.

The narrow size spectrum of the crystals obtained by the process of the invention permits the economical matching of centrifuges or filters to the separation of the solids from the filtrate, thereby not only aiding the purification process but also reducing the loss of small crystal fractions with the filtrate. This facilitates purification of the solvent.

The crystal growth can be controlled by regulating the continuous rate of flow and the rotatary speed of the rotating element. The thermal transfer and material transport in both stages of the system are so adapted to the special requirements of nucleous formation and controlled grain growth that in the first stage high thermal and material transfer numbers are achieved and in the second stage the time of stay as well as the thermal and material transfer numbers are adjusted to the desired grain size.

The performance of the process of the present invention and the results to be obtained thereby are explained hereinbelow with the aid of the appended schematic drawing.

The solution of dimethylterephthalate used in the example is delivered from the tank 1 and enters the nucleation cooler 3 at point 2. In this stage of the crystallization, the nucleus formation rate, the supersaturation and the nucleus growth are so controlled that the crystals emerging with the solvent at point 4 have particle sizes in the size range of about 10–130 microns (i.e. at least about 95 wt. percent of the particles being in said size range), preferably in the size range of about 50–120 microns (i.e. at least about 92 wt. percent of the particles being in said size range), and optimally the particles are about 100 microns (i.e. at least about 90 wt. percent of the particles being in the size range of about 80–105 microns).

Immediately upon emerging from the nucleation cooler 3, which is a tubular heat exchanger for example, the mixture enters at point 5 the crystallizer 6, which is a scraper type cooler for example having scraper-agitators 6a. This apparatus which is equipped with a cooling jacket, is outfitted with a shaft provided with scrapers, operated at moderate speed—about 10 to 100 r.p.m. and operates in the metastable crystallization range, and delivers, with an output temperature as disclosed above, preferably about 35° C., a crystal product of a selected grain size, i.e. in the range of about 150–400 microns (i.e. at least 95 wt. percent of the particles being in said size range), preferably in the range of about 250–350 microns (i.e. at least 90 wt. percent of the particles being in said size range).

In the centrifuge 8 the crystals are separated from the solvent and, depending on the required purity, are delivered to a crystallization stage operating in the same manner, or else they are used directly as the end product.

EXAMPLES

For purposes of comparison, a series of parallel experiments was performed by the prior art method and the method of the invention, under the same initial conditions. 1000 kg. of DMT in crude form as is produced in commercial productions containing about 83 wt. percent DMT, was dissolved in 2800 kg. of methanol at 100° C. The extent of purification was about the same in the two cases.

EXAMPLE 1

Prior Art

The solution of DMT in methanol was placed at 100° C. in an intermediate vessel with a capacity of 12 cubic meters. From there the solution was transferred to the crystallizer (capacity 8 cu. m.) which was equipped with a cooling jacket as well as internal cooling coil of 25 sq. m. surface area. By controlled purging, the vaporized methanol was liquefied in a condenser with a cooling area of 55 sq. m. and collected in the methanol receiver having a capacity of 1 cubic meter from which it was afterward recycled as washing methanol. The suspension was cooled from 65 to about 35° C. in the crystallizer by means of the internal cooling coils. At the end of the batch crystallization the crystallization product was transferred to an intermediate tank of 8 cu. m. capacity and from the intermediate tank was pumped continuously into the centrifuge. The batch crystallization time totalled 120 to 130 minutes.

The crystal product had the following characteristics:

Solidification point _____ Approx. 140.5° C.
Acid number _____ Approx. 0.24.
Hazen color number _____ Approx. 30.
Extinction _____ Approx. 0.5
Fluorescence _____ Approx. 3.

EXAMPLE 2

The Invention

Referring to the drawing, a constant feed of 1900 kg./h. of the DMT-methanol solution, at a pressure of about 3 atm. gauge and about 100° C., was pumped from container 1 with a capacity of 4 cu. m. into the nucleation cooler 3 in which the controlled formation of the nuclei and their growtth to a size of about 100 microns took place within a few seconds at an average output temperature of 90° C.

The cooling surface area in the nucleation cooler 3 amounted to 2.5 sq. m. The thickness of the thin layer of the solution was about 7 mm. Coolers for such service are commercially available.

The suspension was then forwarded to the crystal growing apparatus 6 which was equipped with a cooling surface area of 25 sq. m., where the crystals grew to a size of about 250 to 350 microns in the metastable crystallization range. The cooling of the suspension was controlled such that it had a temperature of about 35° C. upon emergence. The system is outfitted with pumps in a known manner. The crystallization product was then fed directly into the centrifuge where is was separated into solid and liquid phases.

The residence time in the system amounted to about 10 minutes. The quality of the product obtained by this process was:

Soldification point _____ Approx. 140.5° C.
Acid number _____ Approx. 0.24.
Hazen color number _____ Approx. 30.
Extinction _____ Approx. 0.5.
Fluorescence _____ Approx. 3.

This experimental series was performed over a period of several months with the same results.

The process of the invention accordingly reduces the crystallization time in addition to greatly diminishing the cost of the apparatus required for the crystallization of equal amounts of DMT.

The advantages of the process thus lie in:

(1) A higher yield in volume per unit of time,
(2) Substantially lower investment cost,
(3) Lower storage capacity requirement for product and solvent and hence reduced fire hazard in the case of combustible liquid solvents.

What is claimed is:

1. Process for the purification of dimethylterephthalate in a crude form combined with dimethylisophthalate and dimethylorthophthalate, which comprises:
    (a) providing the crude form dissolved in methanol as a solution in which purification can be effected by cooling to precipitate dimethyl-terephthalate of in-increased purity,
    (b) continuously passing said solution serially through a nucleation cooler and a crystallizer,
    (c) cooling the solution in the nucleation cooler to a temperature of about 120–70° C. by indirect cooling for nucleation and crystal growth of dimethylterephthalate to provide a nucleation cooler effluent containing crystals of particle sizes within the range of about 10–130 microns,
    (d) introducing the effluent of the nucleation cooler directly into the crystallizer at substantially the outlet temperature of the nucleation cooler, cooling by indirect cooling and agitating the effluent of the nucleation cooler in the crystallizer, the cooling being to a temperature of about 25–45° C., for further crystal growth of dimethylterephthalate crystals to provide a crystallizer effluent containing dimethylterephthalate crystals of particle sizes within the range of about 150–400 microns.

2. Process according to claim 1,
    (a) the solution being passed through the nucleation cooler as a thin layer and cooled therein to about 100–88° C., and
    (b) crystal growth in the crystallizer being to a particle size range of 250–350 microns.

3. Process according to claim 1, the crystals in the crystallizer effluent being separated by filtration or centrifuging.

4. Process according to claim 1, said agitating in the crystallizer including scraping the surfaces of the crystallizer to keep them clean.

5. Process according to claim 2, said agitating in the crystallizer including scraping the surfaces of the crystallizer to keep them clean.

6. Process according to claim 3, said agitating in the crystallizer including scraping the surfaces of the crystallizer to keep them clean.

7. Process according to claim 1, the solution being passed through the nucleation cooler as a thin film thereof.

8. Process according to claim 7, the solution being cooled in the nucleation cooler to about 100–88° C., the thin film of the solution in the nucleation cooler being about 2–20 mm. thickness, the solution being cooled to about 30–40° C. in the crystallizer.

9. Process according to claim 8, the particle size of the nucleation cooler effluent being about 50–120 microns, the particle size of the crystallizer effluent being about 250–350 microns.

References Cited

UNITED STATES PATENTS 3,076,019    1/1963    Baldwin _____ 260—475 B

OTHER REFERENCES

Technique of Org. Chemistry, vol. III, part I, pp. 479, 480, 510–514 (1956), Weissberger.

LORRAINE A. WEINBERGER, Primary Examiner

E. J. SKELLY, Assistant Examiner

U.S. Cl. X.R.

260—525